United States Patent
Kassel et al.

(10) Patent No.: US 9,163,542 B2
(45) Date of Patent: Oct. 20, 2015

(54) REDUCING AGENT DOSING SYSTEM FOR INJECTION REDUCING AGENT INTO THE EXHAUST GAS FLOW OF AN INTERNAL COMBUSTION ENGINE

(75) Inventors: Armin Kassel, Hagen (DE); Werner Overhoff, Marl (DE)

(73) Assignee: Albonair GmbH, Dortmund (DE)

( * ) Notice: Subject to any disclaimer, the term of this patent is extended or adjusted under 35 U.S.C. 154(b) by 0 days.

(21) Appl. No.: 13/820,216

(22) PCT Filed: Jun. 29, 2011

(86) PCT No.: PCT/EP2011/003196
§ 371 (c)(1),
(2), (4) Date: Apr. 5, 2013

(87) PCT Pub. No.: WO2012/031642
PCT Pub. Date: Mar. 15, 2012

(65) Prior Publication Data
US 2013/0240067 A1    Sep. 19, 2013

(30) Foreign Application Priority Data
Sep. 6, 2010    (DE) .......................... 10 2010 044 468

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |

(52) U.S. Cl.
CPC ........... *F01N 3/2066* (2013.01); *F01N 2610/02* (2013.01); *F01N 2610/08* (2013.01); *F01N 2610/14* (2013.01); *F01N 2610/1433* (2013.01); *Y02T 10/24* (2013.01); *Y10T 137/85978* (2015.04)

(58) Field of Classification Search
USPC ............................................ 60/286, 295, 303
See application file for complete search history.

(56) References Cited

U.S. PATENT DOCUMENTS

| | | | | |
|---|---|---|---|---|
| 6,050,088 | A  * | 4/2000 | Brenner .......................... | 60/303 |
| 8,534,326 | B2 * | 9/2013 | Jochumsen et al. .......... | 137/896 |
| 8,646,475 | B2 * | 2/2014 | Jochumsen et al. ............ | 137/98 |
| 2010/0115932 | A1 * | 5/2010 | Kassel et al. .................... | 60/299 |

FOREIGN PATENT DOCUMENTS

| | | |
|---|---|---|
| DE | 198 05 070 A1 | 8/1999 |
| DE | 101 27 834 A1 | 12/2002 |

(Continued)

*Primary Examiner* — Audrey K Bradley
*Assistant Examiner* — Dapinder Singh
(74) *Attorney, Agent, or Firm* — Law Offices of Robert F. Zielinski LLC

(57) ABSTRACT

The invention relates to a reducing agent dosing system for injecting a reducing agent into the exhaust-gas flow of an internal combustion engine for selective catalytic reduction, wherein the dosing system can be or is connected to a reducing agent tank (1) from which reducing agent is extracted and delivered by means of a reducing agent pump (2), wherein there is a compressed air supply (3) and at least one nozzle (4) is provided which is connected to the pressure line (11) of the reducing agent pump (2) and via which the reducing agent is introduced into the exhaust-gas flow and atomized by means of compressed air, wherein the pressure line (11) of the reducing agent pump (2) issues via an inlet (6) into a valve (5) which, when it is subjected to pressure by reducing agent delivered by the reducing agent pump (2), opens up the inlet (6) to the valve (5) and an overflow duct to an outlet (7) of the valve to a dosing line (12) to the nozzle (4).

9 Claims, 1 Drawing Sheet

(56) References Cited

FOREIGN PATENT DOCUMENTS

| DE | 203 08 348 U1 | 7/2004 |
| DE | 10 2008 049 097 A1 | 4/2010 |
| DE | 10 2008 053 275 A1 | 4/2010 |

\* cited by examiner

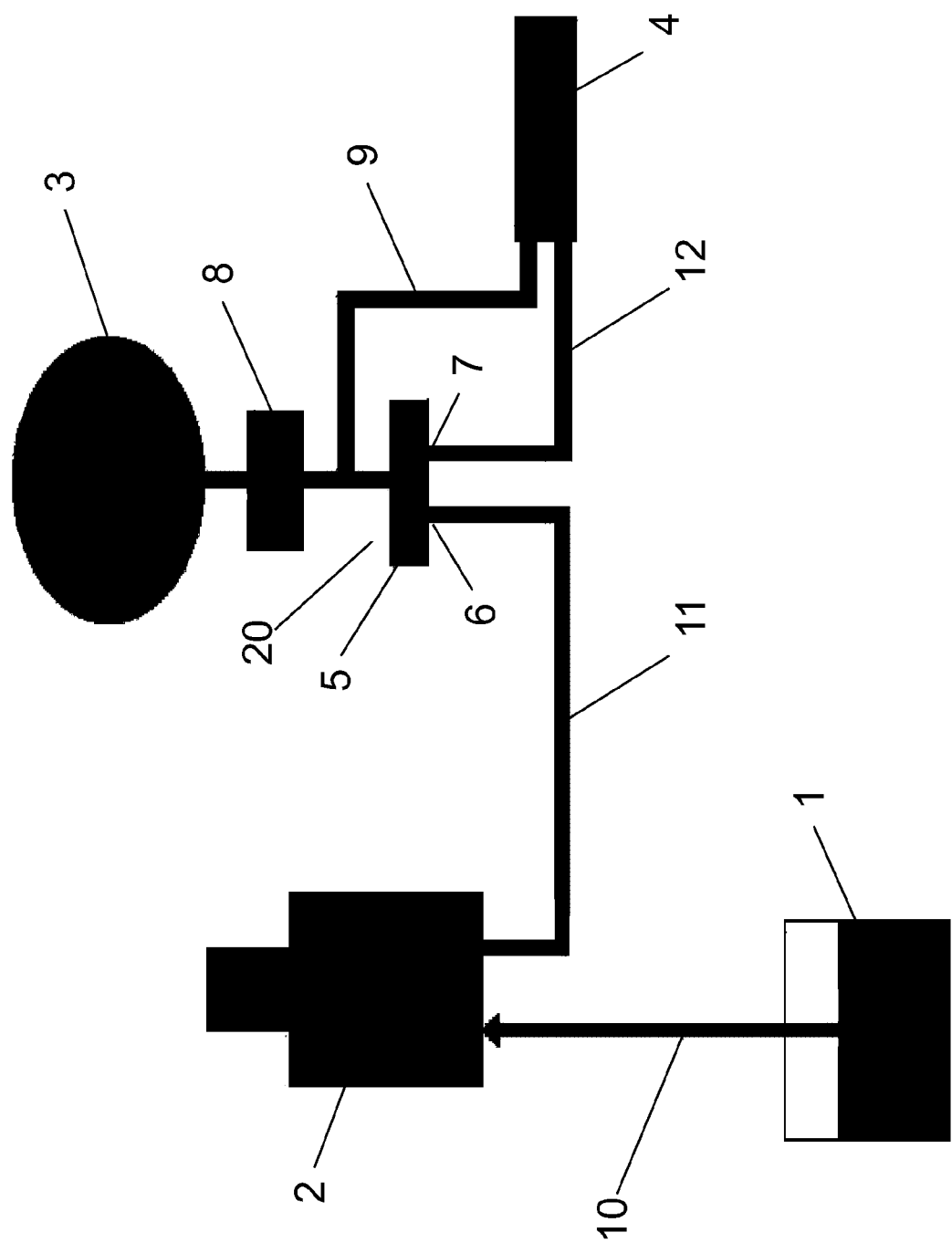

REDUCING AGENT DOSING SYSTEM FOR INJECTION REDUCING AGENT INTO THE EXHAUST GAS FLOW OF AN INTERNAL COMBUSTION ENGINE

CROSS-REFERENCE TO RELATED PATENT APPLICATIONS

The present application is a U.S. national stage application under 35 U.S.C. §371 of PCT Application No. PCT/EP2011/003196, filed Jun. 29, 2011, which in turn claims the priority benefit of German Patent Application No. 10 2010 044 468.5, filed Sep. 6, 2010, the entireties of which are incorporated herein by reference.

The invention relates to a reducing agent dosing system for injecting a reducing agent into the exhaust-gas flow of an internal combustion engine for selective catalytic reduction, wherein the dosing system can be connected or is connected to a reducing agent tank, from which reducing agent is extracted and is delivered by means of a reducing agent pump, wherein there is a compressed air supply and at least one nozzle is arranged that is connected to the pressure line of the reducing agent pump and through which the reducing agent is introduced into the exhaust-gas flow and is atomized by means of compressed air.

Catalysts (in English: selective catalytic reduction, abbreviated: SCR) are used to reduce the nitrogen oxide emissions of diesel engines, combustion plants, waste incineration plants, industrial plants, and the like. For this purpose, a reducing agent is injected into the exhaust-gas system with a dosing device Ammonia, an ammonia solution, or another reducing agent is used as the reducing agent.

Since carrying ammonia in vehicles is safety-critical, urea in an aqueous solution with usually a 32.5% urea content according to DIN 70070, so-called AdBlue, is used. In the exhaust gas, the urea breaks down at temperatures above 150° Celsius into gaseous ammonia and $CO_2$. Parameters for the decomposition of urea are primarily time (evaporation and reaction time), temperature, and droplet size of the injected urea solution. In these SCR catalysts, the emission of nitrogen oxide is reduced by about 90% by selective catalytic reduction (English: selective catalytic reduction, SCR).

A diaphragm pump or a piston pump is used to deliver the reducing agent. A drawback to this approach is the fact that the pump used delivers its stroke volume toward the nozzle during the delivery stroke in a very short interval, about 5 msec. In this period of time, there is a delivery surge that causes a high flow rate of the reducing agent. During the pump stroke or after its completion, the reducing agent flowing in the dosing line pulls more reducing agent through the pump valves. Because of this, an undesired and therefore unknown additional dosing is discharged into the exhaust-gas flow.

Another disadvantage is that the pulsations of a diaphragm pump or piston pump create an intermittent loading of the atomizing nozzle with the reducing agent. This effect alone can cause an overloading of the nozzle at low delivery rates.

The object of the invention is to further develop a reducing agent dosing system of the above-mentioned type in such a way that undesirably high flow velocities of the delivered reducing agent and uncontrolled reducing agent delivery are avoided and thus overloading of the nozzle due to a delivery stroke of the feed pump used is prevented.

This object is achieved according to the invention by a reducing agent dosing system according to claim 1. Advantageous developments to the invention are specified in the respective subclaims.

The terms reducing agent dosing system and dosing system are used synonymously in the context of this description. The terms reducing agent solution and reducing agent each mean any reducing agent suitable for selective catalytic reduction; for this purpose a urea solution according to DIN 70070 is preferably used. The invention is, however, not limited to this.

In the case of the reducing agent dosing system for the injecting of a reducing agent into the exhaust-gas flow of an internal combustion engine for selective catalytic reduction, where the dosing system can be connected to or is connected to a reducing agent tank, from which the reducing agent is taken and delivered by means of a reducing agent pump, where there is a compressed air supply and at least one nozzle is arranged that is connected to the pressure line of the reducing agent pump and through which the reducing agent is introduced into the exhaust-gas flow and is atomized by means of compressed air, it is particularly advantageous for the pressure line for the reducing agent pump to empty through an inlet into a valve that, when there is pressurization by means of the reducing agent delivered by the reducing agent pump, opens up the inlet to the valve and an overflow duct to an outlet of the valve to a dosing line to the nozzle.

According to the invention, a valve is arranged in the pressure line between the reducing agent pump and the nozzle; when there is pressurization by means of the reducing agent delivered by the reducing agent pump, said valve opens up the inlet to the valve and an overflow duct to the outlet of the valve in the direction of the nozzle.

Through the arrangement and suitable selection of the valve, the counter-pressure desired for the operation of the pump can therefore be created according to the pump manufacturer's specification. The heart of the invention consists therefore of the arrangement of an active valve in the pressure line of the dosing system.

In a preferred embodiment, the inlet and the outlet of the valve close automatically when there is no pressurization by means of the reducing agent delivered by the reducing agent pump.

Because of this, a possible but unwanted excess delivery by a valve-controlled pump is avoided, as the outlet of the valve automatically closes when there is no pressurization by means of the reducing agent delivered by the reducing agent pump, i.e. when the pump stroke is completed.

In a particularly preferred embodiment, the valve has a diaphragm that, when pressurized by means of the reducing agent delivered by the reducing agent pump, opens up the overflow duct from the inlet to the outlet of the valve.

A flexible diaphragm of this sort is suitable for automatically opening up the overflow duct when a corresponding delivery pressure is present and, at the end of the pump stroke, when the delivery pressure drops accordingly, for once more closing the overflow duct owing to the return to the starting position of the reversible deflection of the diaphragm.

Preferably, the diaphragm closes the outlet from the valve as well as the overflow duct of the valve when there is an underpressure on the outlet side of the valve.

Because of this, any undesired excess delivery of reducing agent is effectively stopped.

In this case, in one particularly preferred embodiment, the reverse side of the diaphragm which faces away from the inlet and the outlet is pressurized by compressed air from the compressed air supply.

By this measure, the desired pump counter-pressure against which the reducing agent pump delivers can be adjusted to the desired value, i.e., the reducing agent pump delivers against a defined counter-pressure by the pressurization of the diaphragm.

Preferably there is an switching valve by means of which the pressurization of the reverse side of the diaphragm can be shut off so that, because the pressurization of the diaphragm is shut off, the reducing agent pump will deliver against a reduced counter-pressure and thus will intake more easily and can thus vent better.

Preferably the compressed air supply has a pressure control valve.

This means that the compressed air can be adjusted to a pressure level that is desired for the pressurization of the reverse side of the diaphragm and/or for the atomization of the reducing agent by means of compressed air. The compressed air itself can then be taken from an on-board compressed air system, for example in a commercial vehicle in whose exhaust line the dosing system is arranged, without the system pressure prevailing in the compressed air system presenting a limitation since the pressure of the compressed air can be lowered to the desired pressure.

Preferably the reducing agent pump is a diaphragm pump or a piston pump.

In a particularly preferred embodiment of the dosing system, the valve in the pressure line constitutes the pressure-side outlet valve of the reducing agent pump. As a consequence, an additional pump outlet valve that needs to be actuated can be omitted in this particularly advantageous embodiment.

It is particularly preferred that the reducing agent pump has an outlet valve which, when there is pressurization by means of the reducing agent delivered by the reducing agent pump, opens up the pump outlet and automatically closes when there is no pressurization by means of the reducing agent delivered by the reducing agent pump. In this case this pressure-side outlet valve of the reducing agent pump can be formed particularly by the valve in the pressure line.

Preferably the reducing agent pump has an outlet valve that is formed by a diaphragm.

The pressure-side outlet valve of the reducing agent pump can thus itself be formed by a flexible diaphragm and can thus cause automatic opening of the pressure-side pump outlet during a delivery stroke, as well as automatic closure of the pump outlet after completion of the delivery stroke.

An automatic outlet valve that is formed by a diaphragm in this way can thus be arranged cumulatively with the valve in the pressure line of the dosing system. Alternatively, the valve provided in the pressure line according to the invention can also simultaneously be the pressure-side outlet valve of the pump.

An embodiment of the invention is shown in the FIGURE and is explained below.
Here:

FIG. 1: Shows a functional diagram of an embodiment of a reducing agent dosing system according to the invention.

FIG. 1 shows a diagram of a reducing agent dosing system according to the invention for injecting a reducing agent into the exhaust-gas flow of an internal combustion engine for selective catalytic reduction. In this case a reducing agent, for example a urea solution, particularly according to DIN 70070, is extracted from a tank 1 and delivered by means of the feed pump 2. In the embodiment shown in FIG. 1, the feed pump 2 is a piston pump.

With each stroke of the piston pump 2, reducing agent is extracted from the tank 1 via the suction line 10 is then delivered via the pressure line 11 and on to an atomizer nozzle 4.

The atomizer nozzle 4 itself is a binary fluid nozzle, in which the reducing agent is atomized by means of compressed air. Aerosol formation consequently happens outside the nozzle body. The invention, however, is not limited to this.

To make available the compressed air required for atomization, a compressed air system 3 is provided that has a pressure control valve 8 in order to adjust the air pressure to the pressure that is required for optimum aerosol formation.

The pressure line 11 of the piston pump 2 empties through the inlet 6 into the valve body 5.

According to the invention, the arrangement of an active valve 5 on the pressure side of the feed pump 2 is thus provided in the dosing system.

The valve 5 is formed from a diaphragm (20) that closes the inlet 6 to the valve 5 as well as the outlet 7 to the dosing line 12. That means that, in the idle state, the inlet hole 6 and the outlet hole 7 of the valve body 5 are closed by the diaphragm (20).

Via the dosing line 12 downstream of the valve 5, the delivered reducing agent is fed to the nozzle 4.

During a delivery stroke of the piston pump 2, the pump 2 now transports reducing agent via the pressure line 11 to the inlet hole 6. This causes the diaphragm to be lifted from the inlet hole 6 and simultaneously from the outlet hole 7, so that the overflow duct in the valve body 5 is opened up. Now the reducing agent can emerge from the valve body 5 toward the dosing line 12 since both the inlet hole 6 and the outlet hole 7, as well as the overflow duct that is then formed inside the valve body 5, are opened up by the diaphragm (20).

The reverse side of the diaphragm (20) in the valve body 5 is exposed to compressed air. For this purpose, the compressed air in the compressed air system 3 provided in the dosing system is used. This can be an on-board compressed air system such as in a commercial vehicle; otherwise, an air compressor and a compressed air tank or compressed air reservoir can be provided.

The pressure of the compressed air from the compressed air system 3 is adjusted to the desired air pressure by means of the pressure control valve 8.

After the pump stroke of the piston pump 2, the diaphragm in the valve body 5 is drawn in by the suction of the reducing agent still flowing in the dosing line 12 and so automatically closes the outlet opening 7. Overdosing is automatically prevented by the fact that the valve 5 operates in this way. The closure of the outlet opening 7 is supported as well by the air pressure that is present on the other side of the diaphragm (20) in the valve body 5. The compressed air, whose pressure is regulated by means of the pressure control valve 8 to the pressure desired for atomization of the reducing agent, is aspirated here via a junction.

Moreover, the pump 2 is exposed to a counter-pressure, which improves the closing process of the pump valves, which also improves dosing accuracy.

To improve the intake behavior of the pump 2, the air pressure control can be switched off. Thus the pump 2 is not exposed to any counter-pressure by the diaphragm (20) of the valve body 5 and can freely dose or vent. Moreover, through the use of the valve 5, the pump stroke is averaged over time, and the flow is continuously ducted to the nozzle 4.

At the time of delivery, i.e. at the time when the diaphragm of the valve is withdrawn and the inlet hole 6 and the outlet hole 7 are opened up, delivery of the reducing agent to the atomizer nozzle 4 via the dosing line 12 occurs.

The atomizer nozzle 4 is a fluid nozzle in which compressed air is fed via the air pressure line 9 from the compressed air system 3 and is used for aerosol formation; in this compressed air system the quantity of reducing agent that is fed via the dosing line 12 is atomized by means of the compressed air.

For this purpose, the desired air pressure is adjusted by means of the pressure control valve 8.

The heart of the invention consists therefore in arranging the valve 5 with a flexible diaphragm (20) that causes on the one hand an averaging of the pump stroke over time and furthermore, by the suction of the dosing agent flowing out in the dosing line 12, automatically closes the outlet hole 7 of the valve 5. This reduces over-delivery of valve-controlled pumps.

Furthermore, it is possible to operate a valve-controlled pump 2 at a favorable operating point with corresponding counter-pressure. An enhanced reproduction accuracy of the delivery amount is obtained with the embodiment according to the invention.

Another advantage consists in the fact that the dosing accuracy becomes more independent of the nozzle 4 used and the position of the tank 1, of dosing line parameters and of geometric design, such as the arrangement of the components. It is possible to provide on the nozzle 4 a high air pressure for the atomization of the reducing agent without this nozzle intaking in the reducing agent independently. Chokes or non-return valves in the dosing section can be omitted. Such components would optionally entail operating uncertainties, which are avoided by the approach according to the invention.

This gives rise to an optimized spray pattern of the pneumatic nozzle 4, and maximum atomizer performance of the nozzle 4 is achieved.

The invention claimed is:

1. A reducing agent dosing system for injecting a reducing agent into the exhaust-gas flow of an internal combustion engine for selective catalytic reduction, the dosing system comprising:

a reducing agent tank (1) from which the reducing agent is extracted and delivered to the dosing system by a reducing agent pump (2) operatively connected to a compressed air supply (3);

at least one nozzle (4) connected to a pressure line (11) of the reducing agent pump (2), wherein the reducing agent is introduced into the exhaust-gas flow and is atomized with compressed air from the compressed air supply (3);

a valve (5) including an inlet (6) and an outlet (7), the valve (5) being arranged between the reducing agent pump (2) and the at least one nozzle (4), the valve (5) being further connected with the compressed air supply (3), and the valve (5) including a flexible diaphragm (20) facing the inlet (6) and the outlet (7) on one side and facing the compressed air supply (3) on a reverse side;

wherein the pressure line (11) of the reducing agent pump (2) empties via the inlet (6) into the valve (5), which, when pressurized by the reducing agent delivered by the reducing agent pump (2), opens up the inlet (6) to the valve (5) and an overflow duct to the outlet (7) of the valve (5) to a dosing line (12) that connects the valve (5) with the at least one nozzle (4), and wherein the diaphragm (20) when pressurized by the reducing agent delivered by the reducing agent pump (2), opens up the overflow duct from the inlet (6) to the outlet (7) of the valve, and further wherein the reverse side of the diaphragm (20) that faces away from the inlet (6) and the outlet (7) is exposed to compressed air from the compressed air supply (3), so that the reducing agent pump (2) delivers due to the pressurization of the diaphragm (20) against a defined counter-pressure.

2. The dosing system according to claim 1, wherein the inlet (6) and the outlet (7) of the valve (5) automatically close when there is no pressurization due to the reducing agent being delivered to the valve (5) by the reducing agent pump (2).

3. The dosing system according to claim 1, wherein, when there is an under pressure on the outlet side of the valve, the diaphragm (20) closes the outlet (7) of the valve (5) as well as the overflow duct of the valve (5).

4. The dosing system according to claim 1, wherein the pressurization of the diaphragm (20) by compressed air can be switched off utilizing a switching valve, so that by shutting off the pressurization the reducing agent pump (2) delivers against a reduced counter-pressure and thus intakes more easily.

5. The dosing system according to claim 1, wherein the compressed air supply (3) further includes a pressure control valve (8).

6. The dosing system according to claim 1, wherein the reducing agent pump (2) is a diaphragm pump or a piston pump.

7. The dosing system according to claim 1, wherein the reducing agent pump (2) includes an outlet valve that, when pressurized by the reducing agent delivered by the reducing agent pump (2), opens up the pump outlet and automatically closes, when there is no pressurization due to the reducing agent delivered by the reducing agent pump (2).

8. The dosing system according to claim 7, wherein the valve (5) in the pressure line (11) forms the pressure-side outlet valve of the reducing agent pump (2).

9. The dosing system according to claim 7, wherein the outlet valve is formed by the diaphragm (20).

* * * * *